(12) United States Patent
Habermacher

(10) Patent No.: US 10,052,908 B2
(45) Date of Patent: Aug. 21, 2018

(54) BICYCLE WHEEL

(71) Applicant: SCOTT Sports SA, Givisiez (CH)

(72) Inventor: Timothy Habermacher, Zurich (CH)

(73) Assignee: SCOTT Sports SA, Givisiez (CH)

(*) Notice: Subject to any disclaimer, the term of this patent is extended or adjusted under 35 U.S.C. 154(b) by 42 days.

(21) Appl. No.: 15/052,517

(22) Filed: Feb. 24, 2016

(65) Prior Publication Data

US 2016/0243888 A1 Aug. 25, 2016

(30) Foreign Application Priority Data

Feb. 24, 2015 (CH) .......................... 246/15
Feb. 24, 2015 (DE) .................... 20 2015 001 363 U

(51) Int. Cl.
*B60B 1/00* (2006.01)
*B60B 1/02* (2006.01)
(Continued)

(52) U.S. Cl.
CPC .............. *B60B 1/003* (2013.01); *B29C 70/46* (2013.01); *B32B 37/14* (2013.01); *B32B 38/0012* (2013.01); *B60B 1/0215* (2013.01); *B60B 1/0269* (2013.01); *B60B 1/06* (2013.01); *B60B 1/14* (2013.01); *B60B 5/02* (2013.01); *B60B 21/02* (2013.01); *B60B 21/023* (2013.01); *B29L 2031/3091* (2013.01); *B29L 2031/32* (2013.01); *B32B 2605/00* (2013.01); (Continued)

(58) Field of Classification Search
CPC ....... B60B 1/0269; B60B 1/00; B60B 1/0223; B60B 1/0284; B60B 1/0246; B60B 3/02; B60B 1/0215; B60B 1/003; B60B 1/06; B60B 21/02; B60B 21/06; B60B 21/023; B60B 5/02; B32B 37/14; B32B 38/0012
See application file for complete search history.

(56) References Cited

U.S. PATENT DOCUMENTS 818,175 A * 4/1906 Howe ................... B60B 1/0215
301/55
1,289,517 A * 12/1918 Musselman ............... B60B 9/26
152/80
(Continued)

FOREIGN PATENT DOCUMENTS

DE         9201179    6/1992
DE  10 2008 007 722 A1   8/2008
(Continued)

OTHER PUBLICATIONS

European Search Report dated Jul. 6, 2016 in Patent Application No. 16 15 6947, citing documents AP and AQ therein, 2 pages.
(Continued)

*Primary Examiner* — Kip T Kotter
*Assistant Examiner* — Scott A Browne
(74) *Attorney, Agent, or Firm* — Oblon, McClelland, Maier & Neustadt, L.L.P.

(57) ABSTRACT

The invention relates to a bicycle wheel made of a fiber composite material, including a rim, a plurality of spokes, and a center, wherein the spokes each have a first and second spoke section extending between the rim and the center, wherein the first and second rim section have a curved shape in a laminated state and the two rim sections extend straight in a pretensioned state.

16 Claims, 16 Drawing Sheets

(51) Int. Cl.
  *B60B 21/02* (2006.01)
  *B32B 37/14* (2006.01)
  *B32B 38/00* (2006.01)
  *B60B 1/14* (2006.01)
  *B60B 1/06* (2006.01)
  *B60B 5/02* (2006.01)
  *B29C 70/46* (2006.01)
  *B29L 31/32* (2006.01)
  *B29L 31/30* (2006.01)

(52) U.S. Cl.
  CPC ... *B60B 2310/242* (2013.01); *B60B 2360/341* (2013.01); *B60B 2900/111* (2013.01); *B60B 2900/112* (2013.01); *B60B 2900/113* (2013.01); *B60B 2900/1216* (2013.01); *B60B 2900/311* (2013.01)

(56) References Cited

U.S. PATENT DOCUMENTS

| | | | | |
|---|---|---|---|---|
| 4,573,745 A | * | 3/1986 | Fujisaki | B60B 1/003 301/64.703 |
| 5,104,199 A | * | 4/1992 | Schlanger | B60B 1/003 301/64.704 |
| 5,228,756 A | * | 7/1993 | Krampera | B60B 1/0261 301/58 |
| 5,540,485 A | * | 7/1996 | Enders | B60B 5/02 301/104 |
| 5,779,323 A | * | 7/1998 | Burrows | B60B 1/0246 301/104 |
| 6,068,347 A | * | 5/2000 | Okajima | B60B 1/0223 301/104 |
| 6,196,638 B1 | * | 3/2001 | Mizuno | B60B 1/00 301/104 |
| 6,428,116 B1 | * | 8/2002 | Chou | B60B 1/003 301/104 |
| 7,926,884 B2 | * | 4/2011 | Heyse | B29C 70/342 301/104 |
| 2007/0035175 A1 | * | 2/2007 | Lin | B60B 1/0215 301/55 |
| 2009/0050276 A1 | * | 2/2009 | Lacombe | B60B 1/0269 157/3 |
| 2011/0193402 A1 | * | 8/2011 | Yamamoto | B60B 1/02 301/56 |
| 2014/0292061 A1 | * | 10/2014 | Lew | B60B 21/023 301/55 |

FOREIGN PATENT DOCUMENTS

| | | |
|---|---|---|
| EP | 1795370 A1 | 6/2007 |
| EP | 1 985 434 A1 | 10/2008 |
| EP | 1985465 A1 | 10/2008 |
| EP | 2030765 A2 | 3/2009 |
| GB | 978913 A | 1/1965 |

OTHER PUBLICATIONS

European Search Report dated Jul. 6, 2016 in Patent Application No. 16 15 6936, citing document AO therein, 2 pages.

\* cited by examiner

Fig. 12(a)
Fig. 12(b)
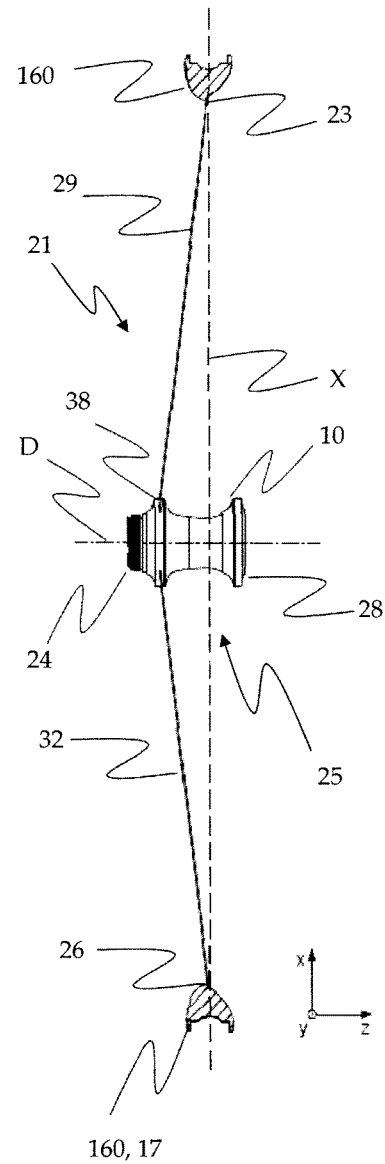
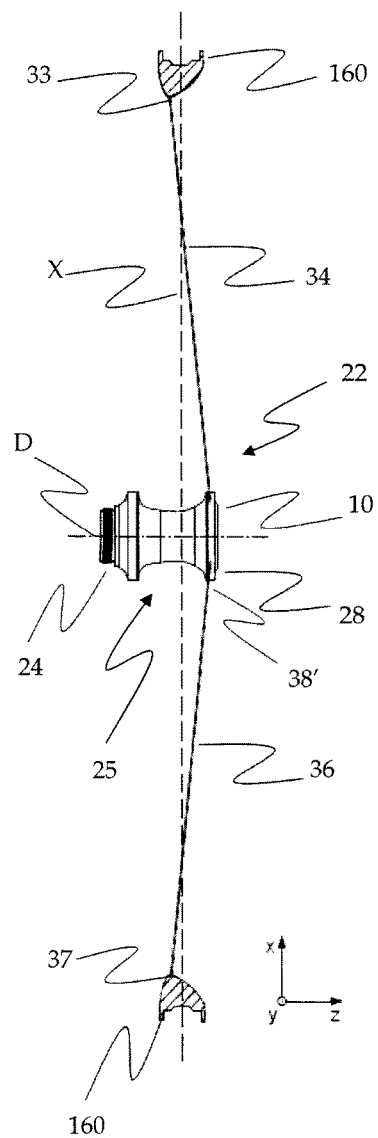

BICYCLE WHEEL

TECHNICAL FIELD

The present invention relates to a bicycle wheel according to the preamble of claim 1. Furthermore, the present invention relates to a method for producing a bicycle wheel.

STATE OF THE ART

Numerous developments have been made in recent years in the field of bicycle wheels, in particularly for the sport of cycling. In this area of sports, weight, rigidity of material and aerodynamics, which is mainly attributed to rim geometry, play an essential role. In its basic elements, a wheel consists of a hub, spokes and a rim. This also applies to wheels made of fiber composite materials, in particular carbon. In the field of bicycle wheels that are made from fiber composite materials, a basic distinction is made between disc wheels, wheels with solid spokes and wheels with pretensioned spokes. Wheels with pretensioned spokes are considered according to the present invention, wherein both the spokes and the rim are made from a fiber composite material, preferably carbon.

EP 2030765 A2 describes a method for producing a wheel for bicycles, wherein the rim and spokes are made of a cured fiber composite material, for example carbon, and the wheel has pretensioned spokes. As can be taken from EP 2030765 A2, the production of the rim and the subsequent attachment of the spokes take place in two separate procedures. A plurality of working steps is necessary for the production of the rim alone. Beginning with the production of the outer rim profile, followed by preparing a molded plastic element which is connected to the outer rim profile and covered with a covering layer. The individual spokes, which, just as the rim, consist of a fiber composite, are mounted on the already prefabricated rim only in a second process independent of the first procedure. The entire wheel is hardened again at the end to ensure a strong bond between the rim and the spokes.

In this manufacturing method as in conventional processes for the processing of fiber composite materials, lamination is used. Curing also falls under the process step of lamination. Examples of conventional laminating methods are published in DUBBEL, Handbook of Mechanical Engineering, 22nd edition, F25.

The process previously described in the prior art has the disadvantage that essentially two separate processes are required, one for the production of the rim, spokes and hub, and another for the fixing of the individual spokes to the rim and to the central holder, i.e. to the hub.

As already mentioned, aerodynamics plays an increasing role in cycling. In general, the aerodynamic resistance of the wheel as well as the robustness in crosswinds is to be optimized. In this context, many companies thus attempt the development of special wheel geometries. Many of the rim cross-sections developed in recent years have a V-shape, however "bellied" cross-sections have also increased in importance, in order to better control the release behavior in crosswinds. The release behavior of the flow at the rim profile has a great influence on the riding comfort and line guidance in crosswinds.

For years, the Zipp company has marketed so-called aero wheels, in which the rim has a kind of golf ball surface.

US 204/0292061 from the firm Reynolds Cycling LLC is noted at this point as an example of a current development in the field of rim geometries for carbon wheels. This document discloses an asymmetric geometry of a rim made from carbon fiber with pretensioned steel spokes. Also described is the production of the asymmetric rim geometry, in particular the arrangement of the carbon fiber layers in a negative mold. Mentioned are the fixing and pretensioning of spokes. This document, however, does not indicate how the individual spokes are to be reliably fixed to the asymmetric rim and how the pretensioning process for the individual spokes is carried out.

In EP 1985465 A1, a spoke, a wheel and a method for manufacturing a spoke from a fiber composite material is described. In the manufacture of the wheel, the production of the spokes first takes place in a separate process step in the sense of a prefabrication. These spokes are then joined in a further process step with the likewise prefabricated rim. A disadvantage of this method is the connection of the rim and the spokes in two steps. In order to ensure the greatest possible hold of the spokes in the rim, it is necessary to specially fan out the spokes at their ends, so that a reliable connection of the spokes with the rim can be made at all possible.

Other examples of bicycle wheels made of composite materials in which pretensioned spokes are used can be found in EP 1795370 A1 and DE 9201179. In both documents, the spokes are inserted into a recess, which is seated on the rim, and fixed and tensioned, for example by means of a screw connection, in a separate process step.

SUMMARY OF THE INVENTION

It is the object of the invention to provide a bicycle wheel made of a fiber composite material and a method for producing a bicycle wheel, wherein the disadvantages of known solutions are, at least in certain areas, avoided. Furthermore, the riding comfort of the bicycle wheel is to be optimized and the production method is to be improved. The bicycle wheel is characterized in particular by its simple, lightweight yet robust construction, without the need to dispense with the excellent properties of pretensioned spokes. The production method is characterized in particular by the small number of process steps, whereby the risk of potential production losses is minimized and production times can be reduced accordingly.

The object is achieved by the characteristics of the claims.

When hereinafter a bicycle wheel is mentioned, this term covers both the rear wheel and front wheel.

When hereinafter a laminated state of the first and second spoke sections is mentioned, this is defined as the initial state of the spokes. In this initial state, the first and second spoke sections are not tensioned and are not yet applied with spoke pretensioning force.

When hereinafter a pretensioned state of the first and second spoke sections is mentioned, this is defined as a final state of the spokes, in which the spokes are applied with a spoke pretensioning force, i.e. pretensioned. The subsequently used hub holds the spokes in the pretensioned state and therefore in the final state.

The inventive bicycle wheel, which preferably has disc brakes, is made from a fiber composite material. This type of bicycle wheel is used preferably in racing. It comprises a rim and a plurality of spokes, wherein the spokes each have a first and a second spoke section, which each extend between the rim and the center of the bicycle wheel. The center comprises two opposing center discs.

The spokes are so-called pretensioned spokes. According to the invention, the first and second spoke sections of the spokes have a curved shape in a laminated state. In a pretensioned state, the spoke sections extend substantially straight.

Through the embodiment in a curved shape in the laminated state, stress peaks which arise in the spokes or the spoke sections during the pretensioning process are advantageously reduced, which is not the case in spokes which are laminated straight and subsequently pretensioned. High tensions result in such spokes due to the bending moments, in particular in the regions in which the spoke sections come into contact with the rim and the center or center discs, said tensions being undesirable and reducing the maximum possible loading of the spoke. Through the inventive bicycle wheel, the most homogeneous stress distribution possible is achieved in the spokes or the individual spoke sections. Furthermore, the brake force application is improved by a homogeneous stress distribution in the spokes. Spokes with a homogeneous stress distribution have also proven to be more resistant to stone chips, which often occur directly on the rim in rough terrain. By reducing the stress peaks, braking forces which are introduced by a disc brake can be better introduced into the rim. Due to the lamination in a curved shape, the region in which the first and second spoke sections emerge from the rim and that region in which the first and second spoke sections connect to the center, preferably a first and second center disc, are already preformed tangentially to the position in which the spoke sections are received in the pretensioned state.

In a preferred embodiment of the invention, the curved shape has the shape of an S-curve. This curve extends up to its first zero crossing, i.e. one half of the S-curve, according to the bending line of a bending beam of the simple beam theory. In this embodiment, the S-curve assumes a symmetrical course.

$$w(x)_{S-curve} = \frac{Y_{bgl}}{2} * \left[ 3\left(\frac{x}{L}\right)^2 - \left(\frac{x}{L}\right)^3 \right]$$

In the above bending beam formula, Ybgl is the shift between the laminated spoke section and the pretensioned spoke section at a location L, wherein L is half if the spoke section.

In a further preferred embodiment, the S-curve has an asymmetrical shape. An asymmetrical S-curve is characterized in that half of the S-curve deviates from the bending line.

In a further preferred embodiment, the asymmetrical S-curve is characterized in that the point which separates the asymmetrical S-curve into a first and a second half is arranged closer to the rim than to the center of the bicycle wheel.

In a further preferred embodiment, the asymmetrical S-curve is characterized in that the point which separates the asymmetrical S-curve into a first and a second half is arranged closer to the center of the bicycle wheel than to the rim.

In a further preferred embodiment of the invention of the inventive bicycle wheel, the spokes form a first and a second spoke group. The spokes of the first spoke group extend between the first base points arranged on the rim, a disc brake side of the center, wherein the center is preferably formed by two opposing center discs, and the second base points, which are substantially opposite the first base points, are likewise arranged on the rim. The spokes of the second spoke group extend between further first base points arranged on the rim, a non-disc brake side of the center, wherein the center is preferably formed as further center discs, and further second base points, which lie substantially opposite the first base points, are likewise arranged on the rim. The spokes comprising the first and second spoke sections extend in their fiber orientation continuously between the two base points.

In a further preferred embodiment of the invention, the spokes form a first and a second spoke group. The first spoke sections of the spokes of the first spoke group extend here between the first base points arranged on the rim on a brake disc side and the brake disc side of the center. The second spoke sections extend between the brake disc side of the center and second base points arranged on the rim on the brake disc side. The first spoke sections of the spokes of the second spoke group extend between first base points arranged on the rim on a non-brake disc side and the non-brake disc side of the center. The second spoke sections extend between the non-brake disc side of the center and second base points arranged on the rim on the non-brake disc side.

In a further embodiment, the first spoke sections of the spokes of the first spoke group extend between first base points arranged on the rim on a non-brake disc side and the brake disc side of the center. The second spoke sections extend between the brake disc side of the center and second base points arranged on the rim on the non-brake disc side. The first spoke sections of the spokes of the second spoke group extend between first base points arranged on the rim on a non-brake disc side and the brake disc side of the center. The second spoke sections extend between the non-brake disc side of the center and second base points arranged on the rim on the brake disc side. Through this inventive arrangement of the spokes, a better force introduction from the spokes into the wheel occurs. Furthermore, this leads to an improvement of the fiber orientation, so that the stability of the spokes in the base points is increased. The risk that the spokes could tear out of the base points is minimized.

In a further preferred embodiment, the first and second base points of the first spoke group and/or the first and second base points of the second spoke group are spaced apart from an apex S of the rim. The distance from the first and second base points of the first spoke group to the apex S of the rim is greater than the distance between the first and second base points of the second spoke group. The apex S of the rim is the region of the rim body which is opposite to the rim well. In the pretensioning of the spokes, the rim well is positioned centrally. According to the invention, the rim is preferably formed as a symmetrical body, particularly preferably as a symmetrical hollow body. Assuming a symmetrical rim geometry, the lowest point of the rim well and the apex S lie in one plane, the plane of symmetry of the rim, which forms at the same time a vertical plane of symmetry of the bicycle wheel.

The apex S runs in the sectional plane of symmetry of the bicycle wheel with the rim body and faces the center of the bicycle wheel. To improve the driving experience, it is advantageous if the spoke tension in the pretensioned state is approximately equal in both the spokes of the first spoke group on the brake disc side as well as in the spokes of the second spoke group on the non-brake disc side. This is achieved inter alia through the inventive arrangement of the base points. A symmetrical shape of the rim also improves the aerodynamics of the bicycle wheel per se.

In a preferred embodiment, the center has two opposed center discs, one on the brake disc side and one on the non-brake disc side, wherein the center discs are inclined by an angle gamma (γ) to an axis w, wherein the angle gamma (γ) has a value between 6 and 8°. An advantage which results from the inclination of the center discs is the minimizing of radial interlaminar forces which can arise, for example, during pretensioning of the spokes.

In a further preferred embodiment, the first and second spoke sections of the spokes form individual crossing points, wherein the crossing points are formed through individual unidirectional fiber layers of the spoke sections. Through the arrangement in a plurality of layers, the cross-section is thickened at the crossing point. The crossing point of the spoke sections is formed according to the invention in that the layers of the first spoke section are alternatingly laminated with the layers of the further first spoke section, so that an interweaving is formed at the crossing point. Through this interweaving results a solid spoke crossing, wherein this spoke crossing increases the system rigidity. For example, a first layer of the first spoke section is overlaid by a first layer of a further first spoke section, wherein this first layer is then overlaid by a second layer of the first spoke section, followed by a second layer of the second spoke section. In a preferred embodiment, the crossing point is formed by at least four layers. An interweaving occurs through the inventive construction of the crossing point, so that additional material-fitting connections of the individual spoke portions can be avoided.

In a further preferred embodiment, the first and second spoke sections of the first spoke sections enclose an introduction angle β (beta) in the pretensioned state with the outer geometry of the rim, in particular the rim body, which introduction angle is preferably between 120° and 180° and the first and second spoke sections of the second spoke group enclose an introduction angle α (alpha), which is greater than 90°.

In a further preferred embodiment of the invention, the rim does not have a symmetrical but rather an asymmetrical rim body. Here, the asymmetrical rim body has a cross-sectional area or a cross-section which is asymmetric with respect to the plane of symmetry of the bicycle wheel.

An advantage of the variation of the rim cross-section is that in this manner the length of the spoke sections of the first and second spoke groups can be designed to be approximately equally long. In addition, the introduction of force in the rim is optimized.

In one embodiment of the bicycle wheel with asymmetrical rim body, the asymmetrical rim body has a different rim cross-section in the region of the first and second base points of the spokes of the first spoke group than in the region of the first and second base points of the spokes of the second spoke group. Due to the variation of the cross-section, the rim is not rotationally symmetrical, i.e. designed to be rotationally asymmetrical with respect to the rotational axis of the bicycle wheel.

In a further embodiment of the bicycle wheel with asymmetrical rim body, the asymmetrical rim body has the same rim cross-section in the region of the first and second base points of the spokes of the first spoke group as in the region of the first and second base points of the spokes of the second spoke group. Unlike the previously illustrated embodiment, the cross-section does not vary and the rim is rotationally symmetrical with respect to the axis of rotation of the bicycle wheel.

In a further embodiment of the bicycle wheel with symmetrical rim body, the symmetrical rim body has the same rim cross-section in the region of the first and second base points of the spokes of the first spoke group as in the region of the first and second base points of the spokes of the second spoke group. The rim is therefore rotationally symmetrical with respect to the axis of rotation of the bicycle wheel.

In a further embodiment of the bicycle wheel with symmetrical rim body, the rim is not rotationally symmetrical, i.e. designed to be rotationally asymmetrical with respect to the axis of rotation of the bicycle wheel.

In a further preferred embodiment the angles "delta" and "epsilon" of the spokes in relation to the symmetry plain of the bicycle wheel are, on the brake disc side as well as on the non-brake disc side, substantially equal. This results in an approximately equal pre-tensioning force of the pre-tensioned spokes. Furthermore, the brake force application is optimized.

According to the invention, the rim, the spokes and the center, having a first and a second center disc, are laminated in one step. Only the hub is inserted in a separate process step and adhered to the center or center discs. The stability of the bicycle wheel is thereby increased and the number of adhesion points which require additional process steps is prevented. Preferably, the spokes are laminated continuously, i.e. the fiber course of the first and second spoke sections extends continuously between the base points. Lamination in one step means that the molds comprising the shape of the rim, spokes and center are applied with fibers in one step. The fibers of the spokes, preferably unidirectional fibers, are laid completely from a first base point to an opposite base point. By manufacturing in one piece, additional adhesion points are avoided, which have proven disadvantageous in particular in those areas of the bicycle wheel affected by braking forces, for example in the area which receives the brake disc, where the braking forces are transferred via the spokes to the rim. In addition, weight is saved by avoiding additional adhesion points.

In the method according to the invention, after the completion of the first basic step comprising laminating and curing, a bicycle wheel is obtained which comprises the rim, the center with first and second center discs and the still un-pretensioned spokes connected to the rim and the center discs. After completion of the second basic step, a bicycle wheel is obtained with pretensioned spokes.

In the laminating step, it is to be understood that all fibers, for example fibers from so-called prepreg material (preimpregnated fibers) for the rim, spokes and center, having two center discs, are laid in one process step into the molds provided for this purpose before curing occurs. After curing, a one-piece product is obtained, a bicycle wheel comprising the rim, spokes and center. In a second basic step the pre-tensioning of the spokes is then carried out, in which the center or the two center discs are pulled apart in the horizontal direction approximately to the size of the subsequently used hub, before this is inserted. By manufacturing in one piece, time-consuming additional process steps, such as a connecting of prefabricated spokes to the rim, are avoided.

Advantages which result in particular from the inventive production are a highly precise concentricity, quiet operation even at high speeds and a much improved rotational inertia.

In a preferred embodiment of the inventive method, in the first basic step the first and second spoke sections, which extend between the rim and the center, are each laminated in a curved shape, preferably in an S-shape, so that in the second basic step during pretensioning of the spokes, the first and the second spoke sections assume a substantially straight course.

In the inventive method, the curing may preferably occur in an autoclave. After the rim, spokes and center have been laminated in the two mold parts, a freely formable filler, for example a vacuum hose or a foam material, is introduced between the mold parts. When a negative pressure is applied, in that air is sucked out of the mold, the volume of the freely formable filler increases correspondingly and presses the laminated rim into a desired position.

The transfer molding method is available as an alternative curing method. In the use of the transfer molding process, dry fibers are used, i.e. fibers which upon application have not yet been impregnated with resin, in comparison to the prepreg fibers. In the transfer molding process, the mold parts are pressed together and brought into their desired shape through the introduction of compressed air into a freely formable filler. During molding, the introduction of resin and the process of curing occurs in one step.

In a preferred embodiment of the invention, the formation of the spokes takes place in that a punch form is applied to the laminated spokes in the mold parts. This punch has projections which substantially form-fittingly interact with the mold parts and serve to bring the spokes into a desired form, for example to mold an elliptical cross-section. Through this additional form, it is possible to produce spokes of high quality. Furthermore, the spokes may be laminated from unidirectional scrim without an additional cover layer.

The inventive bicycle wheel is made from a fiber composite material. The rim, the spokes, the center and the hub are preferably made from carbon fiber. Preferable as a starting material are so-called prepreg fibers, semi-finished products which are already pre-impregnated with the corresponding reactive resins.

Further examples for fibers are aramid, glass fiber and boron fiber or a combination of said fibers.

In the production of the bicycle wheel, the rim, both that with a symmetrical rim body and that with an asymmetrical rim body, the spokes with the first and second spoke sections and the two center disks are laminated and hardened in one step. Here, the spoke sections have a curved shape. In this manner, a bicycle wheel is obtained in one piece with a rim, the two center discs and the spokes, which are already connected to the rim and the center discs and are not yet pretensioned. In a second step, the pretensioning and the insertion of the hub occur. In pretensioning, the spokes take on a straight course.

In order to achieve the advantageous force application in the transition from the spokes to the rims, in particular in the rim apex region, the geometry or the peripheral course of the rim apex region respectively varies, i.e. the rim apex line along the inner periphery of the rim varies between waved and flat apex regions. The two rim baselines for their part, as in conventional rims, run in circular manner (along the outer periphery of the rim). The rim apex region and the rim baselines are spatially connected via constantly running spatial areas. In preferred embodiments usually at least a G1 consistency is provided for the outer surfaces of the rims. In further preferred embodiments maximally a G2 consistency is provided for the outer surfaces of the rims.

In an alternative embodiment the flat (running in parallel to the rim baselines) apex regions may run obliquely in relation to the rim baselines in the direction of movement of the wheel in order to reduce air drag. In one embodiment these are implemented at an acute angle in the direction of movement of the wheel, wherein the declining flank of the apex purposely declines in a more acute manner.

In an alternative embodiment instead of flat (running in parallel to the rim baselines) apex regions may run obliquely in relation to the rim baselines against the direction of movement of the wheel in order to reduce air drag. In one embodiment these are implemented at an acute angle in the direction of movement of the wheel, wherein the declining flank of the apex purposely declines in a more acute manner.

BRIEF DESCRIPTION OF THE FIGURES

The invention will be described hereinafter in greater detail in conjunction with drawings by means of exemplary embodiments.

FIG. 12(a) shows the embodiment of FIG. 11 in a detailed view with asymmetrical rim and spoke course on the brake disc side of the bicycle wheel, FIG. 12(b) shows the embodiment of FIG. 11 in a detailed view with asymmetrical rim and spoke course on the non-brake disc side of the bicycle wheel.

MODES OF IMPLEMENTING THE INVENTION

When hereinafter a laminated state of the first and second spoke sections is mentioned, this is defined as the initial state of the spokes. In this initial state, the first and second spoke sections are not tensioned and are not yet applied with spoke pretensioning force.

When hereinafter a pretensioned state of the first and second spoke sections is mentioned, this is defined as a final state of the spokes, in which the spokes are applied with a spoke pretensioning force, i.e. pretensioned. The subsequently used hub holds the spokes in the pretensioned state and therefore in the final state.

In an exemplary embodiment, the spoke pretensioning force, which is applied during pretensioning to the first and second spoke sections, is approximately as large on the non-brake disc side as on the brake disc side of the bicycle wheel, preferably the difference between the two pretensioning forces is less than 200 N.

Figure 1:
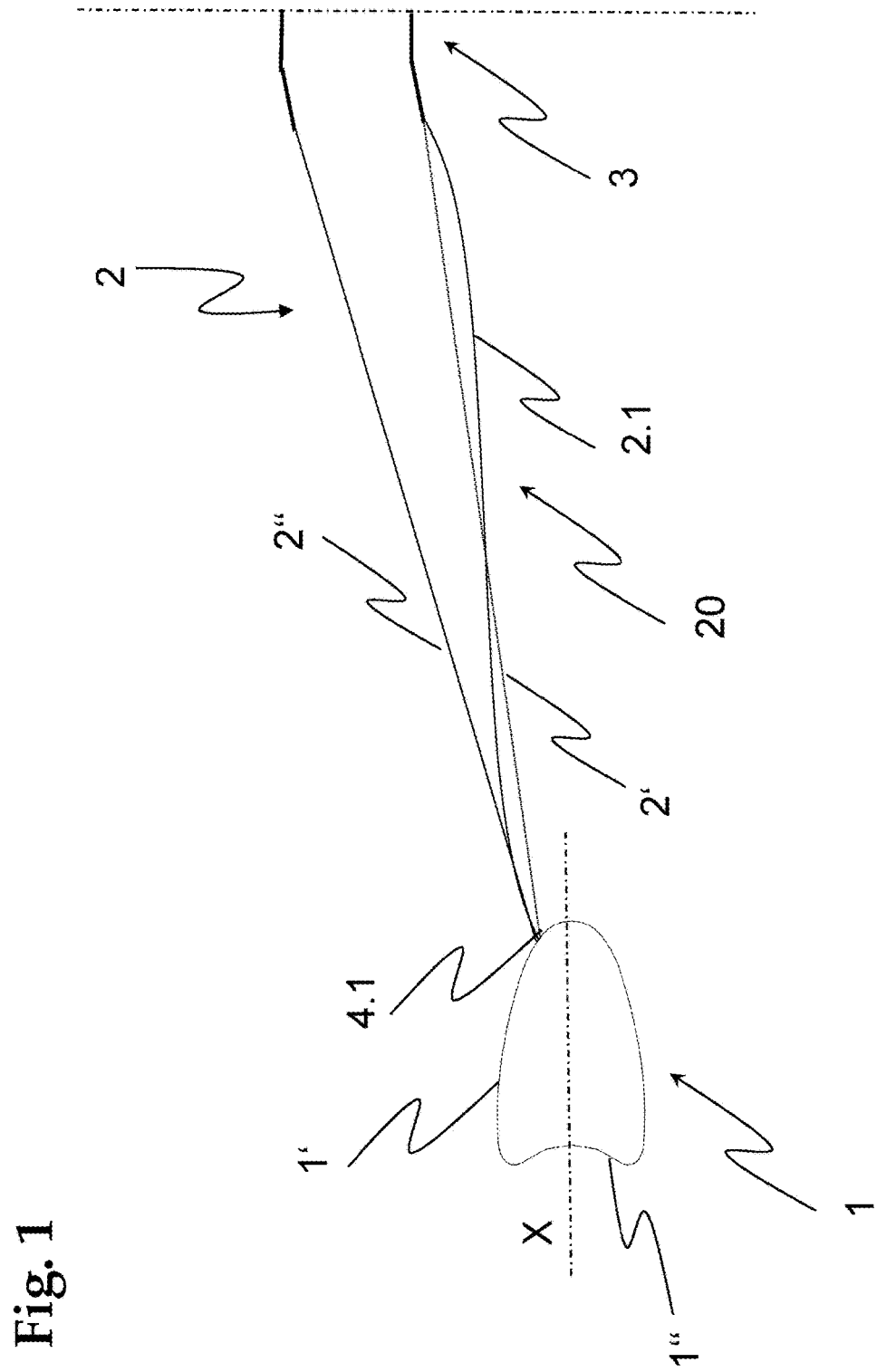
FIG. 1 shows a schematic view of one half of the rim cross-section, a first spoke section in a laminated state and in a pretensioned state, in a first embodiment.

In FIG. 1, a preferred embodiment of the geometry of the spoke 2, in particular the first spoke section 2.1 in the laminated state, is shown. The rim 1 comprises a symmetrical rim body 1' and a rim well 1". Here, FIG. 1 shows one half, comprising the first spoke section 2.1 of a first spoke group 20. The first spoke section 2.1 extends between a base point 4.1 and a center 3 of the bicycle wheel and is curved in the laminated state, before the spokes are pretensioned. In the embodiment shown, the curved shape is formed as a symmetrical S-shape, wherein this curve assumes the bending line of a bending beam of the simple beam theory. The line 2' represents the schematic course of a spoke known from the prior art, which in contrast to the inventive first and second spoke sections 2.1, 2.2 is laminated in a straight extending shape. As shown in FIG. 1, through the curved S-shape the spoke 2 in the region of the base point 4.1 already approaches the course of the pretensioned state 2" even in the laminated state, which leads to a smoothing of stress peaks in the region of the base plate 4.1 and at the entry point at the center 3. In a preferred embodiment, the spokes 2 are made from a UD (unidirectional) scrim of carbon fiber with a tension E-module of 130 GPa to 215 GPa.

Figure 2:
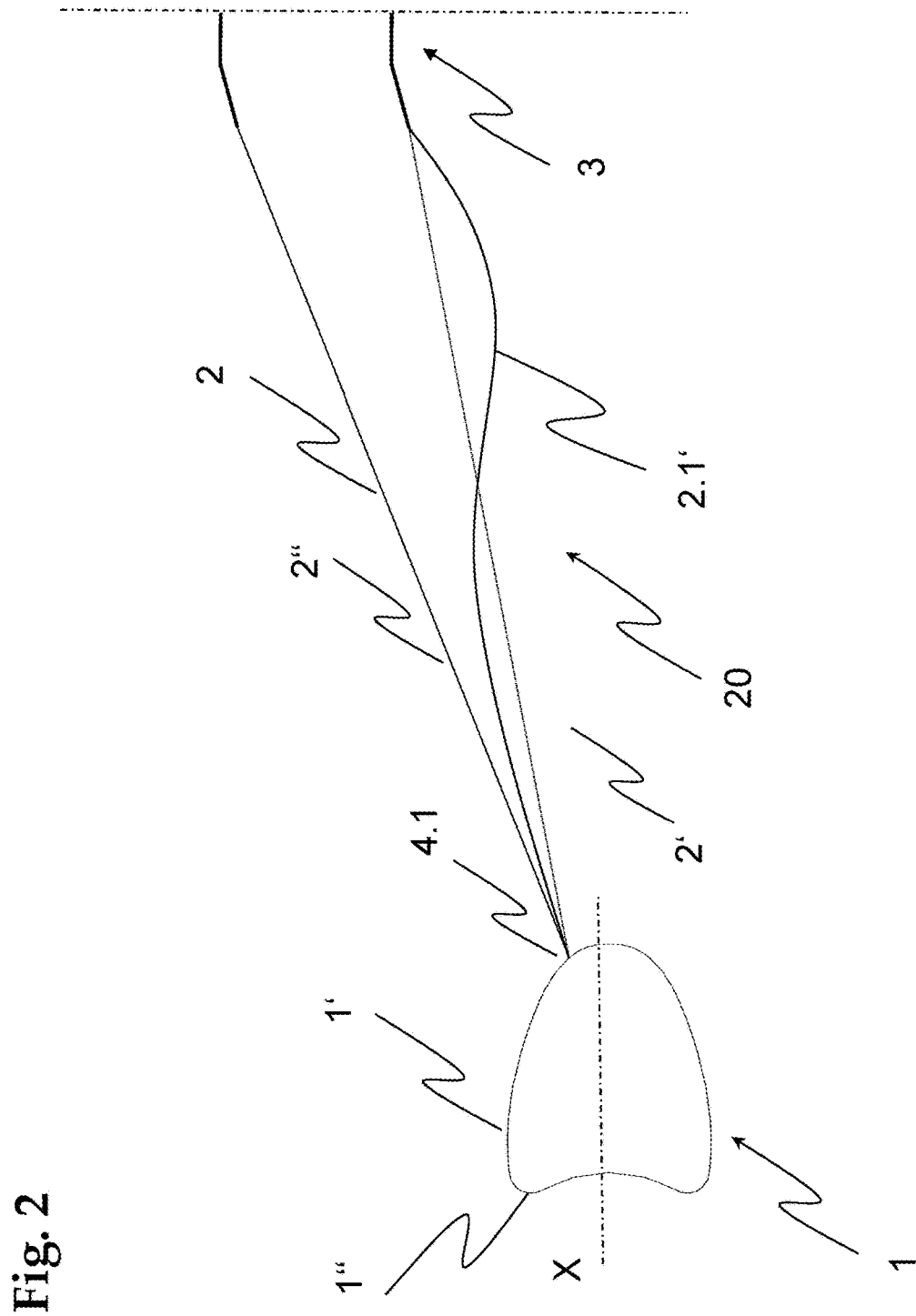
FIG. 2 shows a schematic view of one half of the rim cross-section, a first spoke section in a laminated state and in a pretensioned state, in a second embodiment.

FIG. 2 shows the representation of FIG. 1, with the difference that in this embodiment, the curved form of the first spoke section 2.1' assumes an asymmetrical form, wherein the asymmetrical form is characterized in that half of the S-curve deviates from the bending line.

In a further preferred embodiment (not shown in FIG. 2), the asymmetrical S-curve is characterized in that the point which separates the asymmetrical S-curve into a first and a second half is arranged closer to the rim than to the center of the bicycle wheel. The two halves of the S-curve are not equal and therefore asymmetric.

Figure 3:
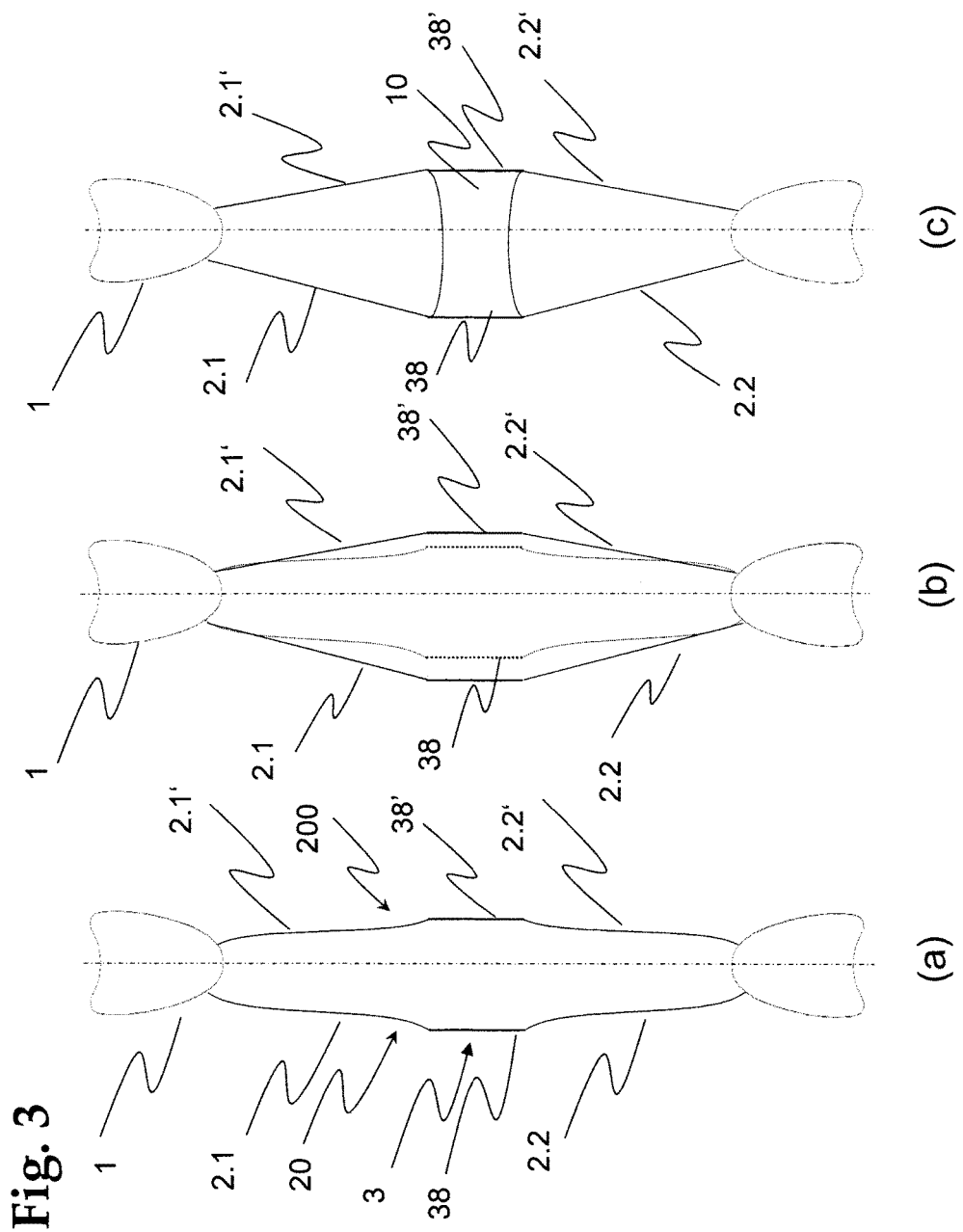
FIG. 3 shows a schematic view of the cross-section through the bicycle wheel in a laminated state (a), a state during pretensioning (b) and a pretensioned state (c)

FIG. 3 shows an example of the three steps (a) to (c) of the process of pretensioning. The image 3(a) shows a cross-section through the bicycle wheel in the laminated state. Here, the rim 1, the spokes 2 of the first and second spoke group 20, 200 comprising the first and second spoke sections 2.1, 2.2; 2.1', 2.2' and the center 3, having a first and second center disc 38, 38', are laminated in one step. The spoke sections are formed in a curved shape in the laminated state. FIG. 3(b) shows the process of pretensioning, the center 3, preferably consisting of two center discs 38, 38', is pulled in the horizontal direction, to approximately the size of the hub, wherein the spoke sections 2.1, 2.2, 2.1' and 2.2' are transferred from their curved shape in the laminated state into a substantially straight course in the pretensioned state. In the last step, as shown in FIG. 3(c), the hub to is inserted, which holds the spokes in the pretensioned state.

Figure 4:
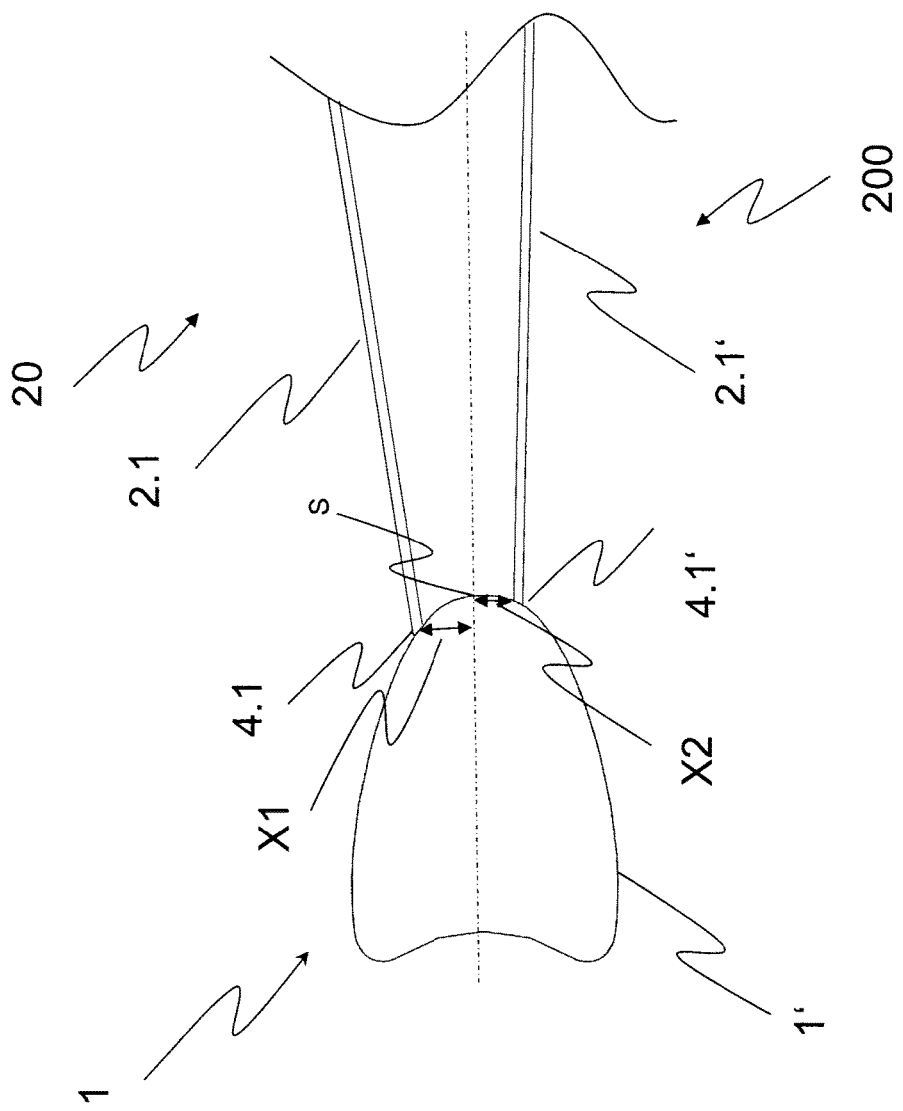
FIG. 4 shows a partially schematic sectional view of one half of the rim cross-section, a first and second spoke section, the first and second spoke group in a pretensioned state.

FIG. 4 shows a cross-section through the rim 1, and a partial view of a first spoke section 2.1 of the first spoke group 20 and the first spoke section 2.1' of the second spoke group 200. The spokes 2 of the first spoke group 20 extend between the first base points 4.1 of a brake disc side of the center 3 and a second base point 4.2 (not shown in FIG. 4). The spokes of the second spoke group 200 extend between a first base point 4.1' of a non-brake disc side of the center 3 and a second base point 4.2' (not shown in FIG. 4). The base points are arranged on the rim body 1' of the rim 1. In this embodiment, the rim 1, in particular the rim body 1', is designed as a symmetrical body. In the embodiment according to FIG. 4, the distance X1 which the base point 4.1 takes from the plane of symmetry of the rim 1 is greater than the distance X2 which the base point 4.1' likewise takes from the plane of symmetry. In a preferred embodiment, the distance X2 is approximately half the distance X1 relative to the rim geometry shown.

Figure 5:
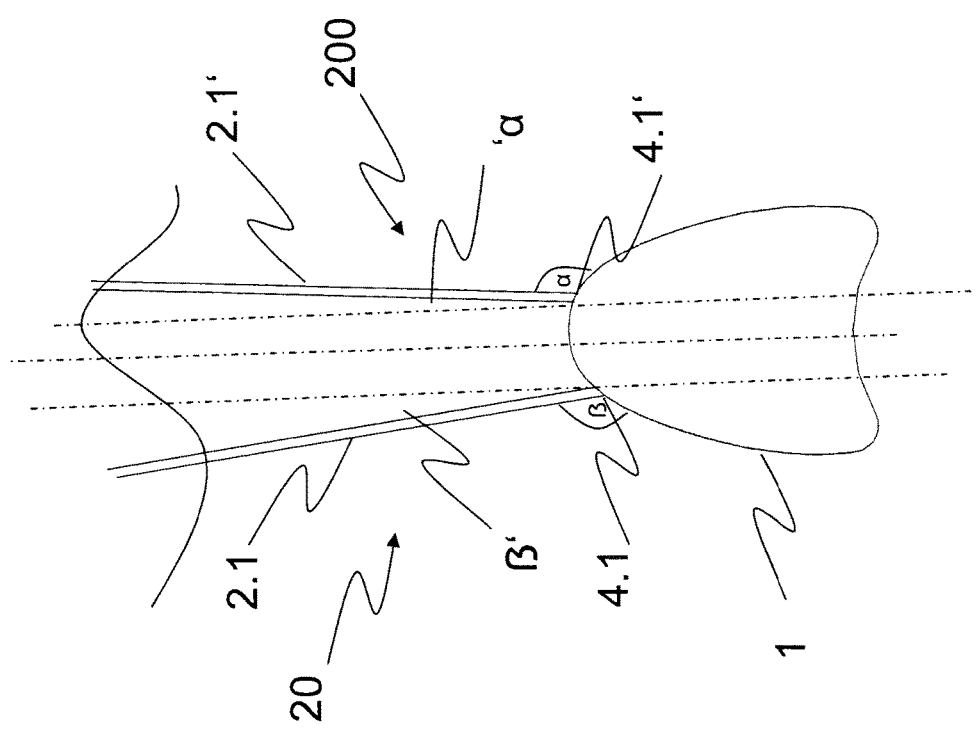
FIG. 5 shows the view of FIG. 4 with the insertion angles α (alpha) and β (beta) of the first spoke sections of the first and second spoke group, in the pretensioned state, in a partially schematic sectional view.

FIG. 5 shows the arrangement of FIG. 4, supplemented by the insertion angle β (beta), which encompasses the first and second spoke section 2.1, 2.2 of the first spoke group 20, in the pretensioned state to the outer geometry of the rim 1 measured from base point 4.1 and 4.2 (not shown). Furthermore, the insertion angle α (alpha) is shown, which encompasses the first and second spoke section 2.1', 2.2' of the second spoke group 200 in the pretensioned state, to the outer geometry of the rim 1, measured from first and second base points 4.1', 4.2'. In the preferred embodiment shown in FIG. 5, the insertion angle β (beta) is between and 180° with respect to the rim geometry shown. The insertion angle α (alpha) has a value of greater than 90°.

Further represented in FIG. 5 is an angle β' (beta-prime) and an angle α' (alpha-prime). The angle α' (alpha-prime) is measured between a plane parallel to the plane of symmetry of the rim 1, which extends through the base point 4.1' and the first spoke section 2.1', in the pretensioned state on the non-brake disc side 31. The angle β' (beta-prime) is measured between a plane parallel to the plane of symmetry of the rim 1, which extends through the base point 4.1 and the first spoke section 2.1, in the pretensioned state on the brake disc side 30. The angles α' (alpha-prime) and β' (beta-prime) differ by a value less than or equal to 2°, wherein α' (alpha-prime) is preferably greater than β' (beta-prime). This relationship between α' (alpha-prime) and β' (beta-prime) is independent of the chosen geometry of the rim 1.

Figure 6:
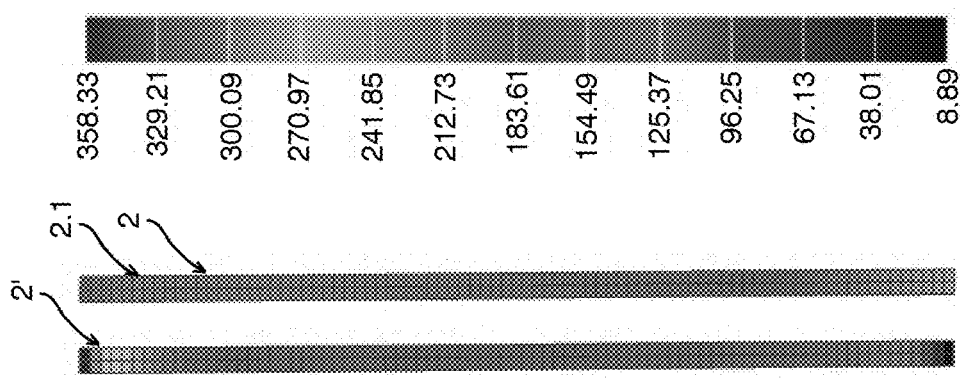
FIG. 6 shows the result of an FEM simulation of the pretensioning process of a spoke section, a comparison between a straight and curved laminated spoke section.

FIG. 6 shows the result of an FEM simulation of the pretensioning process, wherein a spoke section of a spoke 2 which has been laminated substantially straight is contrasted with a spoke section 2.1 of a spoke 2, which has been laminated curved. Observed are the stresses in the direction of the spokes. Both spoke sections, which was laminated straight and that which was laminated curved, were exposed to identical loading forces in the FEM simulation. In the results of the straight-laminated spoke section of the spoke 2', clear stress peaks emerge at the beginning and end of the spoke section (see the black-gray shaded areas). In comparison thereto, the originally curved-laminated spoke section 2.1 of the spoke 2 shows no stress peaks after pretensioning and a homogeneous stress curve.

Figure 7:
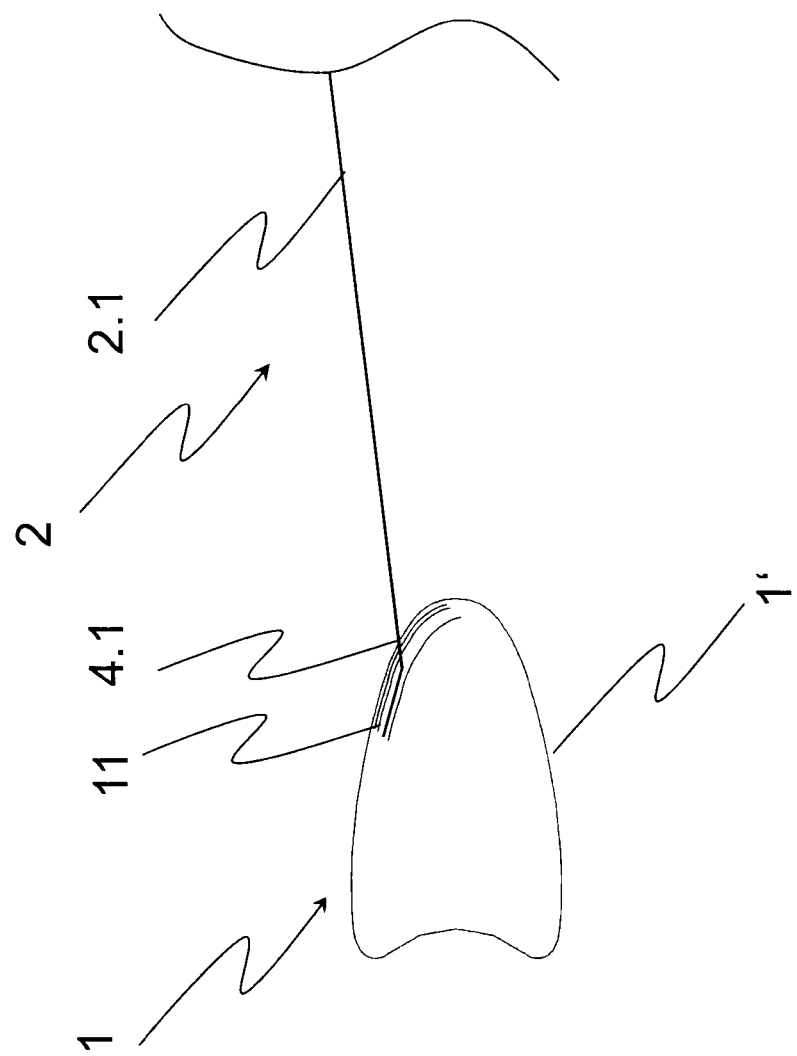
FIG. 7 shows a schematic partial sectional view through the rim, wherein the integration of the spokes in the rim is shown.

FIG. 7 shows a partial view of a cross-section through the rim 1, in the region in which the spokes 2 or the spoke section 2.1 is integrated. In the production of the bicycle wheel, the rim 1, the spokes 2 and the center 3 are laid in one step into an aluminum mold or steel mold. In a preferred embodiment, the spoke 2 is made of a unidirectional scrim of carbon fiber and the rim 1 is made from a fabric, preferably also of carbon fiber.

In a further preferred embodiment, the spokes 2 and the rim 1 are made from a scrim, the spokes from a unidirectional scrim and the rim from a multidirectional scrim.

The spoke 2 is constructed in multiple layers from the unidirectional scrim. Here, its fibers run continuously from a first base point over the center 3 of the bicycle wheel to a second base point 2 arranged on the rim body (not shown in FIG. 7). In the integration of the rim 2 in the rim body 1', the unidirectional scrim of the spoke 2 is attached on the inside of the rim body 1' by at least one, preferably a plurality, of layers of the fabric 11, from which the rim 1 is made. The number of layers 11 and their orientation may vary. An additional bonding of the spoke 2, for example at the base point 4.1, is not required.

Figure 8:
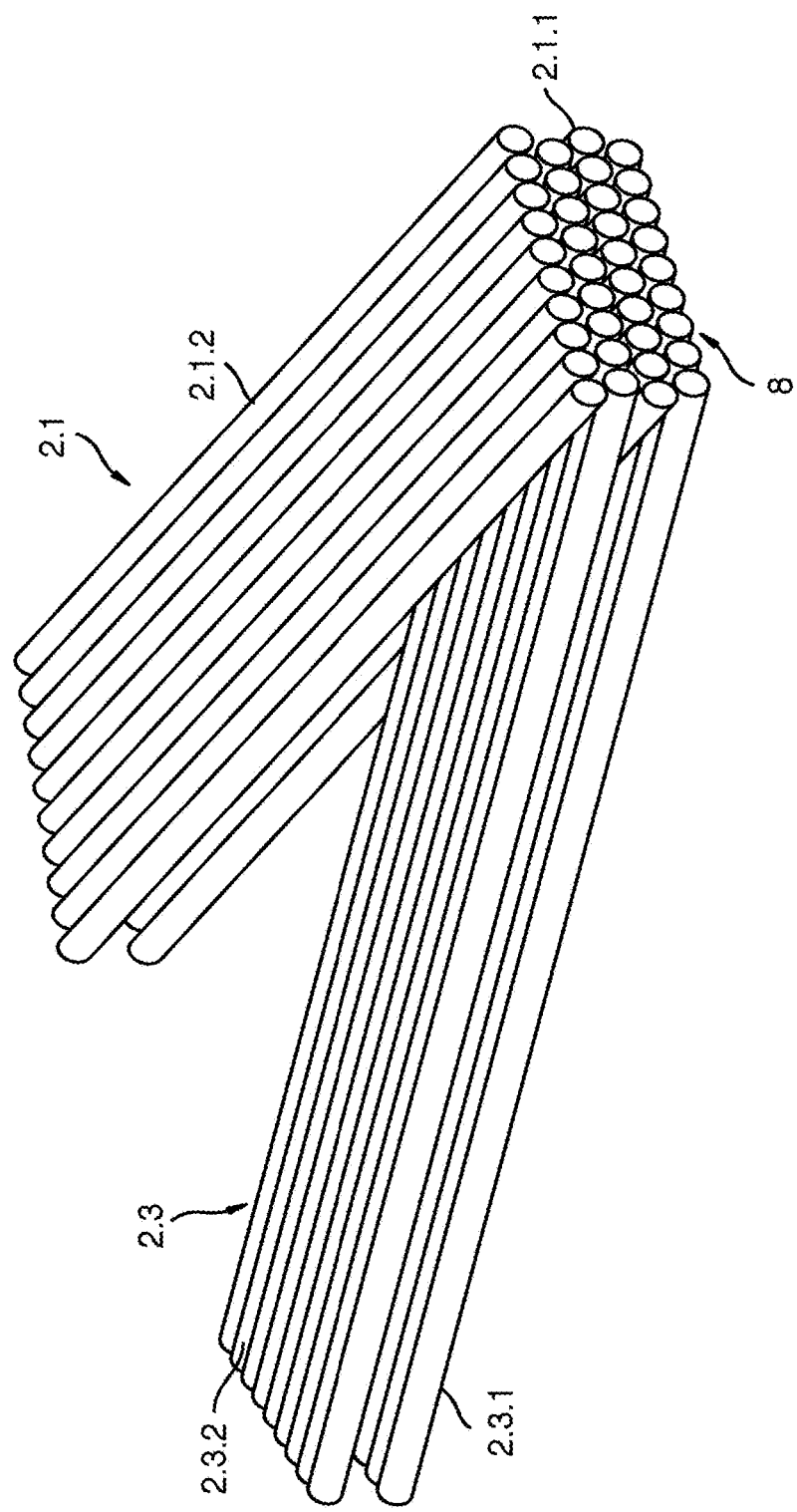
FIG. 8 shows a sectional view through a crossing point of spoke sections.

FIG. 8 shows a section through the crossing point 8, which extends for example through two first spoke sections 2.1, 2.3. Since the first spoke sections are symmetrical to the second spoke sections and form a spoke 2, the second spoke sections also have crossing points 8 (not shown in FIG. 8). As exemplified in FIG. 8, the first spoke section 2.1 and the further first spoke section 2.3 are constructed of a plurality of layers of a unidirectional scrim. The crossing point preferably comprises four layers 2.3.2, 2.3.2, 2.1.1, 2.1.2. In the preferred embodiment according to FIG. 8, the layers 2.1.1 and 2.1.2 of the first spoke portion 2.1 are alternatingly laminated with the layers 2.3.1 and 2.3.1 of the further first spoke section 2.3, so that an interweaving results at the crossing point 8. In FIG. 8, it is not immediately apparent that a thickening of the spoke cross-section results from the at least four layers.

Figure 9:
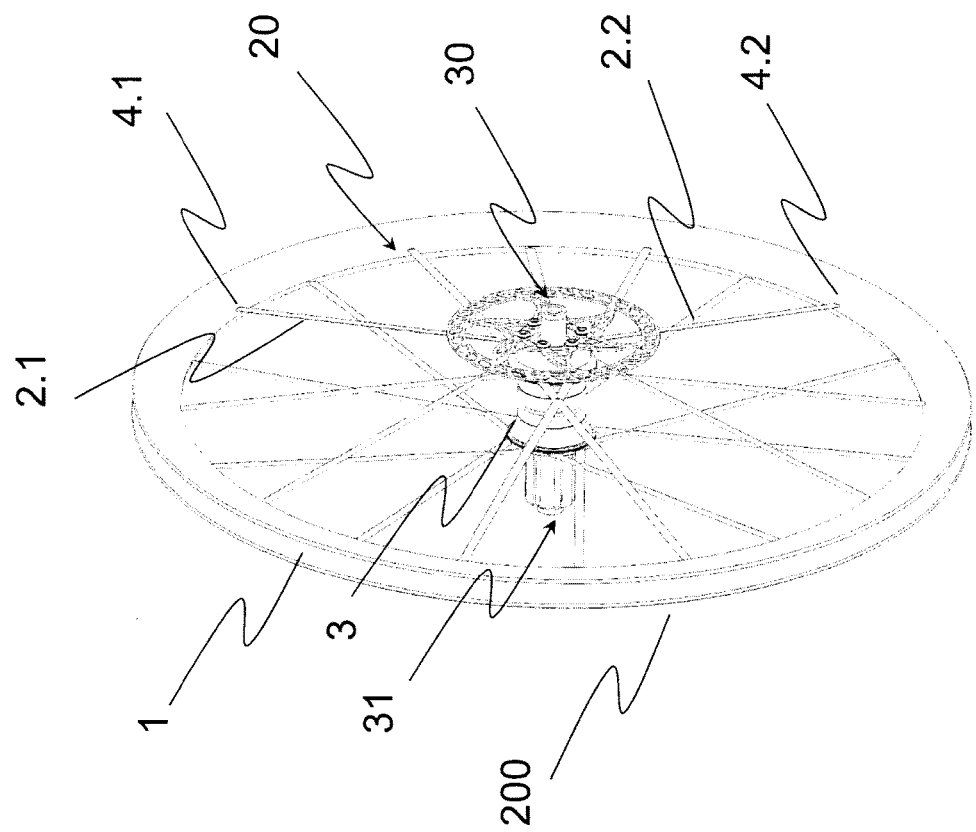
FIG. 9 shows a perspective view of the inventive bicycle wheel.

FIG. 9 shows a perspective view of the inventive bicycle wheel. Shown are the spokes of the first 20, the second spoke group 200 and the non-brake disc side 31 and the brake disc side 30 of the inventive bicycle wheel and the rim 1. A spoke is shown by way of example with reference characters, comprising a first and a second spoke section 2.1, 2.2, wherein this spoke extends continuously between the base points 4.1 and 4.2, which are arranged on the rim 1, and forms a spoke of the first spoke group 20.

Figure 10:
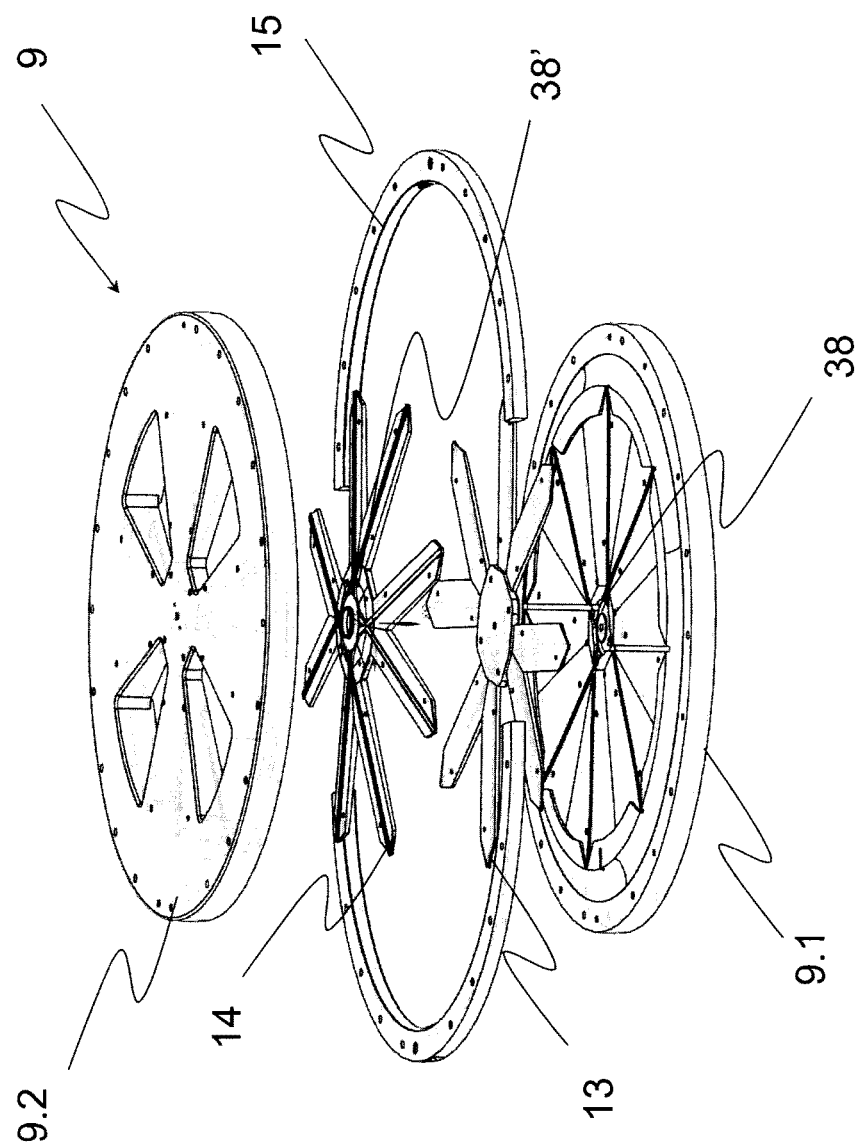
FIG. 10 shows an exploded view of a tool for the production of the inventive wheel.

FIG. 10 shows a preferred embodiment of the inventive negative mold 9. The negative mold 9 comprises a first part 9.1 and a second part 9.2. In these two parts, the fibers for the rim body, the spokes, the center having a first and second center disc 38, 38' are laid into the corresponding recesses in one step. A further mold 15 forms the geometry of the rim well. Further shown are two punch forms 14 and 13. In the assembled state, the negative mold 9 act in a form-fitting manner with the punch forms 13 and 14 with recesses for the spokes. In this way, a desired spoke cross-section is formed.

Figure 11:
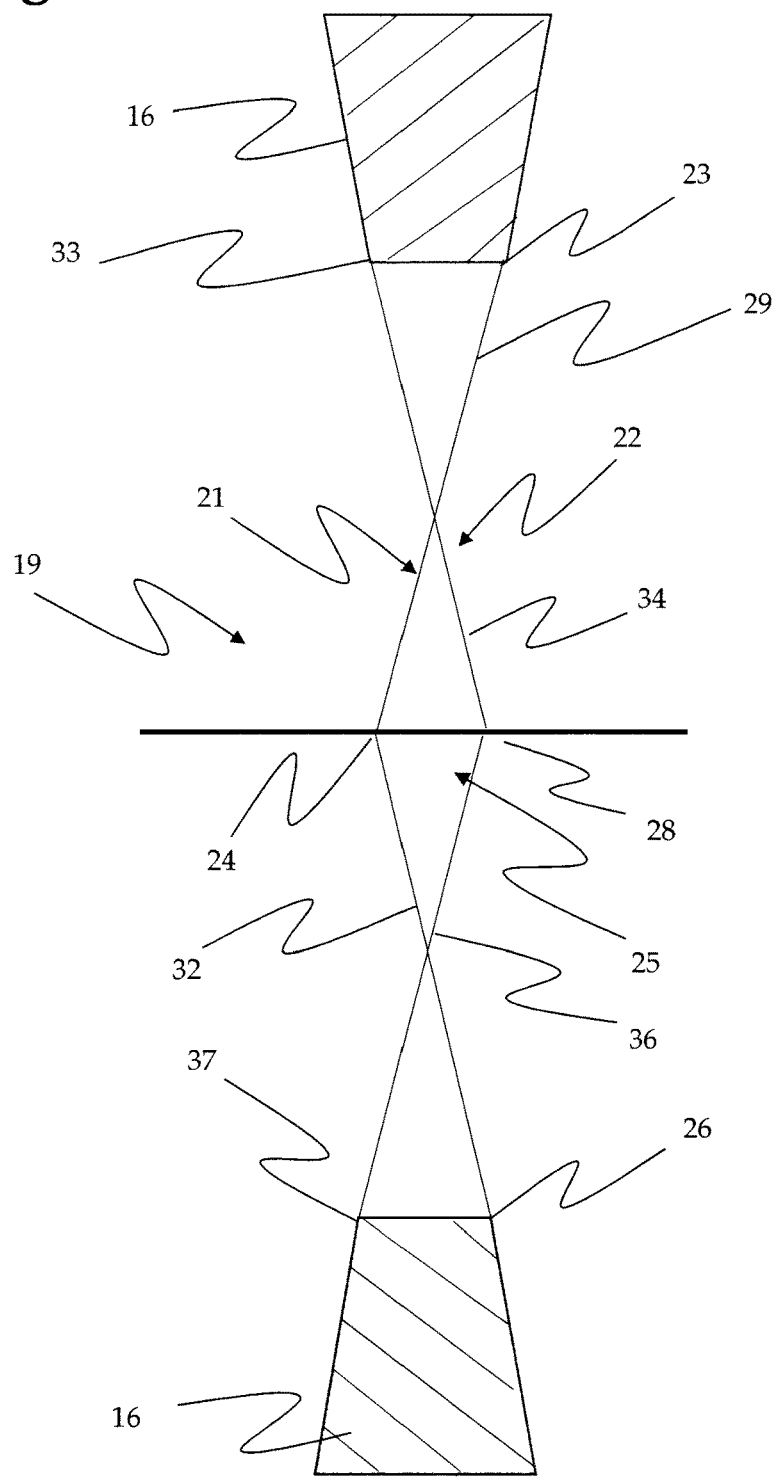
FIG. 11 shows a schematic vertical sectional view of a further embodiment of the bicycle wheel according to the invention, in particular the guiding of the first and second spoke sections.

FIG. 11 schematically shows a further embodiment of the inventive bicycle wheel in a vertical sectional view. The strongly simplified illustration of the rim 16 may have a symmetrical or asymmetrical rim body. In the preferred embodiment shown in FIG. 21, the spokes form a first and a second spoke group 21, 22. The spokes 19 of the first and second spoke group 21, 22 have first and second spoke sections 29, 32, 34, 36. As shown in FIG. 11, the first spoke section 29 of the first spoke group 21 extends between the first base point 23 arranged on the rim 16 on a non-brake disc side 28 as well as a brake disc side 24 of the center 25 and the second spoke section 32 extends between the brake disc side 24 of the center 25 and second base points 26 arranged on the rim 16 on the non-brake disc side. The first spoke sections 34 of the spokes 19 of the second spoke group 22 extend between first base points 33 arranged on the rim 16 on the brake disc side and the non-brake disc side 28 of the center 25. The second spoke sections 36 extend between the non-brake disc side 28 of the center and second base points 37 arranged on the rim on the brake disc side. In the embodiment shown in FIG. 11, the spoke sections are straight. The spokes are pretensioned. The center 25 has two opposing center discs, one on the brake disc side 24 and one on the non-brake disc side 28 (not shown in FIG. 11).

In FIG. 12(*a*), the schematic representation of FIG. 11 is shown in more detail using the example of a rim 160 having an asymmetrical rim body, which is not symmetrical with respect to a vertical plane of symmetry X. A cross-section is shown. Using the example of a spoke comprising a first and a second spoke section 29, 32, the course of the spoke of the first spoke group 21 is shown. The plane X represents the vertical plane of symmetry and the horizontal axis D is the rotational axis of the bicycle wheel. In the embodiment shown, the first and second spoke sections 29, 32 are shown in the pretensioned state. The hub 10 is inserted in the center 25. The center 25 is formed by two opposing center discs 38, 38'. The hub 10 is used to keep the spokes in the pretensioned, final state. The bicycle wheel has a brake side disc side 24 and a non-brake side disc 28. The first spoke section 29 extends between the first base point 23, the point at which the spoke section 29 is embedded in the rim 160 and the center disc 38 on the brake disc side 24. The base point 23 is oriented toward the non-brake disc side 28. The second spoke section 32 extends between the center disc 38 on the brake disc side 24 and the second base point 26, which is oriented toward the non-brake disc side 28. The second spoke section is embedded in the rim 160 at this base point 26.

In FIG. 12(*b*), the schematic representation of FIG. 11 is shown in more detail using the example of a rim 160 having an asymmetrical rim body, which is not symmetrical with respect to a vertical plane of symmetry X. Using the example of a spoke comprising a first and a second spoke section 34, 36, the course of the spoke of the second spoke group 22 is shown. The plane X represents the vertical plane of symmetry and the horizontal axis D is the rotational axis of the bicycle wheel. In the embodiment shown, the first and second spoke sections 34, 36 are shown in the pretensioned state. The hub 10 is inserted in the center 25. The center 25 is formed by two opposing center discs 38, 38'. The hub to is used to keep the spokes in the pretensioned, final state. The bicycle wheel has a brake side disc side 24 and a non-brake side disc 28. The first spoke section 34 extends between the first base point 33, the point at which the spoke section 34 is embedded in the rim 160 and the center 25 formed as a center disc 38' on the non-brake disc side 28. The base point 33 is oriented toward the brake disc side 24. The second spoke section 36 extends between the center disc 38' on the non-brake disc side 28 and the second base point 37, which is oriented toward the brake disc side 24. The second spoke section 36 is embedded in the rim 160 at this base point 37.

Figure 13A:
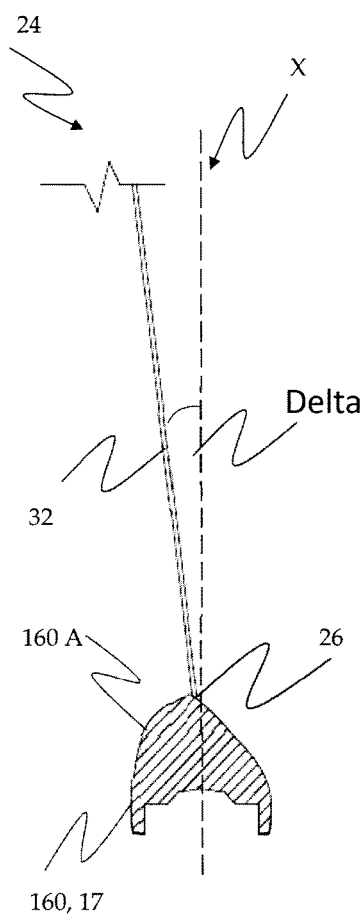
FIG. 13(a) shows a partial detail of FIG. 12(a) comprising a cross-section through the rim and a spoke section in the pretensioned state on the brake disc side.
Figure 13B:
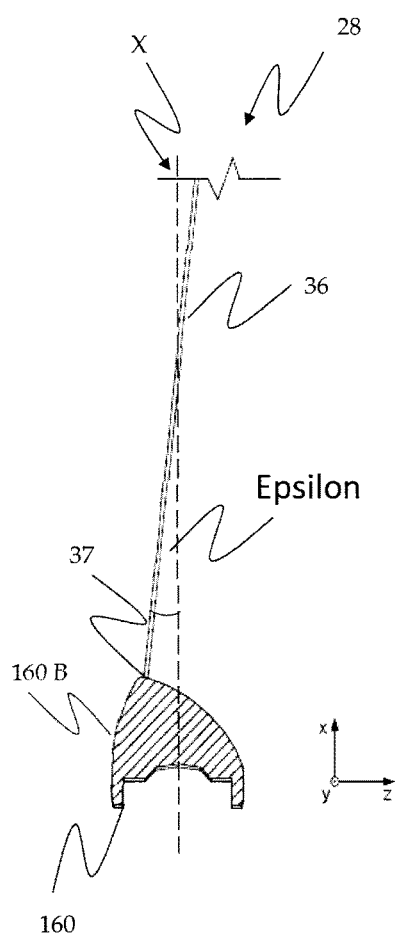
FIG. 13(b) shows a partial detail of FIG. 12(b) comprising a cross-section through the rim and a spoke section in the pretensioned state on the non-brake disc side.

FIG. 13(*a*) shows a cross-sectional view of a detail of FIG. 12(*a*) with the rim 160 having an asymmetrical rim body. X is the plane of symmetry of the bicycle wheel. Shown is a portion of the second spoke section 32, which extends on the brake disc side 24 and is connected at the second base point 26 with the rim 160. Also shown in FIG. 13(*a*) is a spoke angle delta, which encloses the spokes of the first spoke group to the plane of symmetry of the bicycle wheel, in the pretensioned state. The second spoke section 32 in the pretensioned state is shown to represent the spokes of the first spoke group.

FIG. 13(*b*) shows a cross-sectional view of a detail of FIG. 12(*b*) with the rim 160 having an asymmetrical rim body. X is the plane of symmetry of the bicycle wheel. Shown is a portion of the second spoke section 36, which extends on the non-brake disc side 28 and is connected at the second base point 37 with the rim 160. Also shown in FIG. 13(*b*) is a spoke angle epsilon, which encloses the spokes of the second spoke group to the plane of symmetry of the bicycle wheel, in the pretensioned state. The second spoke section 36 in the pretensioned state is shown to represent the spokes of the first spoke group.

The base points 26 and 27 are formed in a rounded manner, in particular in the transition of the spokes to the rim.

From the comparison of the two rim cross-sections 160A and 160B, it can be seen that the rim cross-section has a different cross section in the region of the base point 26 from which the first spoke sections 32 of the first spoke group 21 emerge than the rim cross-section in the region of the base point 37 from which the first spoke sections 32 of the second spoke group emerge.

The spoke angles delta and epsilon are approximately the same size, so that an approximately equal pretensioning force is present on the brake disc side and the non-brake disc side.

Figure 14A:
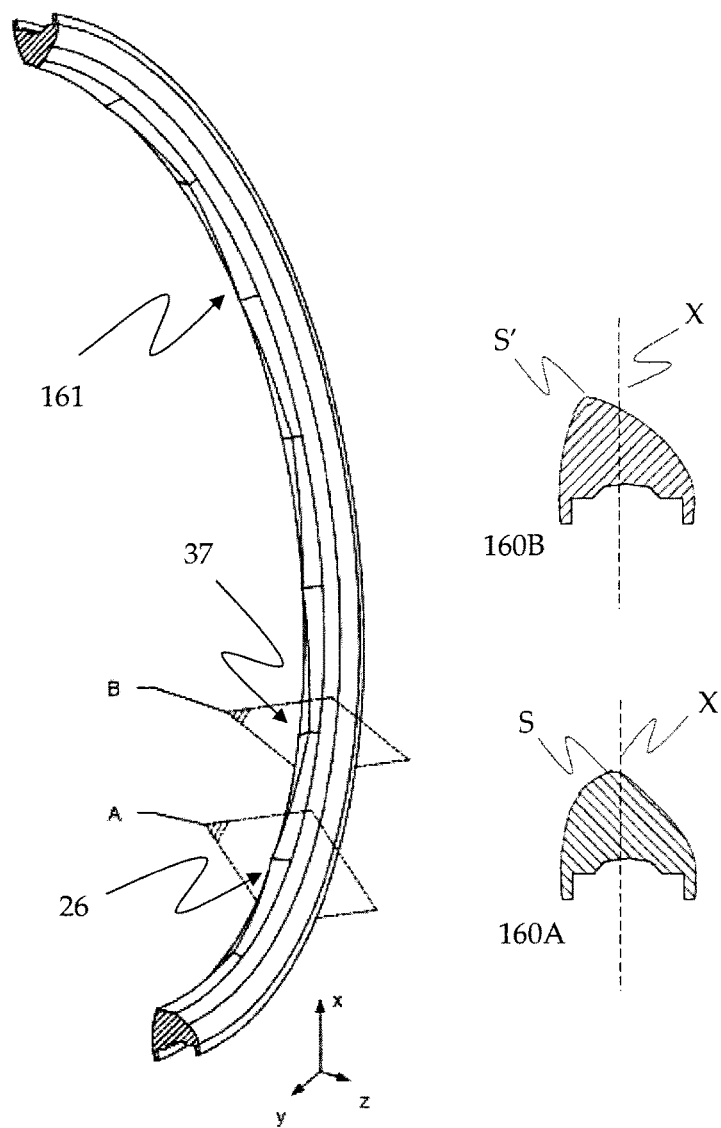
FIG. 14(a) shows the rims of FIG. 13(a) and FIG. 13(b) in a perspective view without spokes.
Figure 14:
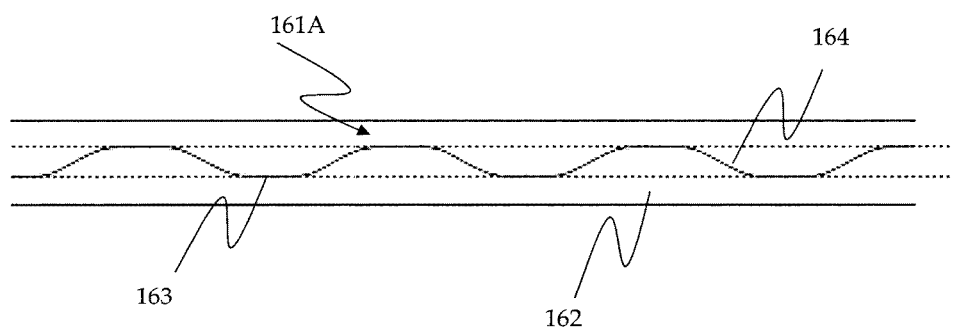
FIG. 14(b) shows a first embodiment of a rim apex region.
FIG. 14(c) shows a second embodiment of a rim apex region.
Figure 14:
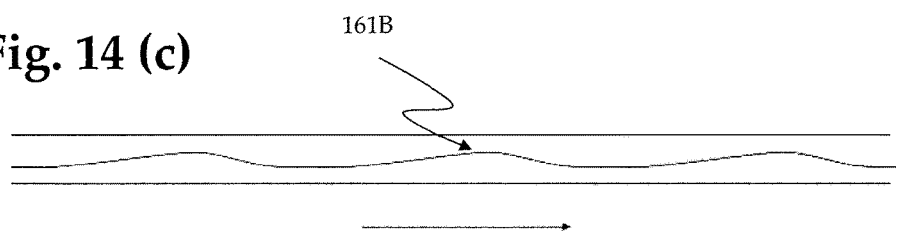

FIG. 14(*a*) shows a partial representation of the rim 160 of FIG. 13(*a*), FIG. 13(*b*) in a perspective view. Furthermore, it is at least partially apparent from FIG. 14(*a*) that rim 160 is not rotationally symmetrical, i.e. designed to be rotationally asymmetrical in relation to rotation axis D. The asymmetry is achieved by means of a variation of the rim cross-section. For a better visualization, two intersections A and B are shown in the regions of base points 26 and base points 37, in order to visualize the differing cross-sections 160A and 160B. Both cross-sections represent an asymmetrical rim body, i.e. both rim bodies are asymmetrical in relation to symmetry plain X of the bicycle wheel. The rotation asymmetry of the rim in relation to rotation axis D is achieved by means of a displacement of apex S towards apex S' in the direction of the Z-axis. As particularly apparent from the embodiment according to FIG. 14(*a*) rim apex region 161 does not run in circular manner but in waved manner with apexes running in flat or oblique manner.

In the embodiment shown in FIG. 14(*a*), the apex S, S' of the cross section 160A varies from the cross-section 160B with respect to a displacement in the direction of the Z axis.

FIG. 14(*b*) shows a possible course of a rim apex region 161A comprising apexes 163, 164 running in flat or oblique manner. The two broken lines represent the two rim baselines 162. As in conventional rims, they run in circular manner (along the outer periphery of the rim).

The apexes 163 with flat courses run in parallel manner to rim baselines 162. The apexes 164 are, viewed in the direction of movement of the bicycle wheel, at defined angles, in relation to rim baselines 162, i.e. they run in oblique manner in relation to these.

FIG. 14(*c*) shows an alternative embodiment of a course of a rim apex region 161B. The shown arrow indicates the direction of movement of the bicycle wheel. According to this embodiment the apex region may, instead of being flat (running in parallel to the rim baselines), run obliquely in relation to the rim baselines in the direction of movement of the wheel, e.g. at an acute angle in the direction of movement of the wheel, wherein the declining flank of the apex purposely declines in a more acute manner.

Figure 15:
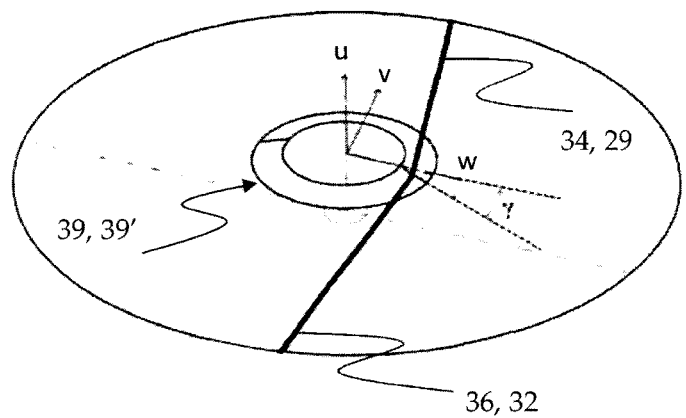
FIG. 15 shows a schematic representation of the bicycle wheel in a view from above with a possible embodiment of the center discs, as they can be found on the brake disc side as well as the non-brake disc side of the bicycle wheel.

FIG. 15 shows a schematic representation of the bicycle wheel in a view from above in an arbitrary three-dimensional coordinate system (u, v, w), wherein with reference to this illustration, a possible embodiment of the center disc 39, 39' is explained. As shown schematically, the spoke sections 34, 36, 29, 32 are connected with the center disc 39, 39', wherein the center disc is inclined at an angle gamma ($\gamma$) to an axis w. This inclination angle is preferably between 6 and 8°. The center disc and the rim do not lie in the same plane.

LIST OF REFERENCE CHARACTERS

1 rim
1' symmetrical rim body
1" a rim well
2 spoke(s)
2' spoke(s) (comparative spoke according to the prior art)
2" spoke course in the pretensioned state
30 brake disc side
20 first spoke group (brake disc side)
2.1, 2.3 first spoke section (brake disc side)
2.2 second spoke section (brake disc side)
4.1 first base point(s) (brake disc side)
4.2 second base point(s) (brake disc side)
⍰ insertion angle (brake disc side)
⍰' angle (brake disc side)
31 non-brake disc side
200 second spoke group (non-brake disc side)
2.1' first spoke section (non-brake disc side)
2.2' second spoke section (non-brake disc side)
4.1' base point(s) (non-brake disc side)
4.2' base point(s) (non-brake disc side)
$\alpha$ insertion angle (non-brake disc side)
$\alpha'$ angle (non-brake disc side)
10 hub
3 one center
8 crossing point
2.3.1, 2.3.2, 2.1.1, 2.1.2 fabric layers
9 negative mold
9.1 first part negative mold
9.2 second part negative mold
15 mold
13, 14 punch form
16, 160 rim
17, 170 rim body
18 rim well
21 first spoke group
19 spokes
22 second spoke group
29 first spoke sections (first spoke group)
32 second spoke sections 32 (first spoke group)
23 first base points (first spoke group)
26 second base points (second spoke group)
28 non-brake disc side
24 brake disc side
25 center
34 first spoke sections (second spoke group)
36 second spoke sections (second spoke group)
33 first base points (second spoke group)
37 second base points (second spoke group)
X vertical plane of symmetry of the bicycle wheel
D axis of rotation
38, 38' center discs
39, 39' spoke surface of extent
160A, 160B rim cross-section

The invention claimed is:
1. A bicycle wheel made of a fiber composite material, comprising:
   a rim;
   a plurality of spokes; and a center,
wherein the spokes each have a first spoke section and a second spoke section extending between the rim and the center,
wherein, in a laminated state, the first spoke section and the second spoke section each have a curved shape,
wherein, in a pretensioned state, the first spoke section and the second spoke section each extend substantially straight,
wherein the first and the second spoke sections each form a crossing point with a further first and second spoke sections,
wherein the crossing point is formed from individual layers of the spoke sections, the individual layers comprising at least four layers, and
wherein, at the crossing point, the layers of the first spoke section are laminated alternatingly with the layers of the further first spoke section, so that an interweaving results at the crossing point.

2. The bicycle wheel according to claim 1, wherein the first and second spoke sections have an S-shape in the laminated state.

3. The bicycle wheel according to claim 2, wherein the S-shape has a symmetrical shape or an asymmetrical shape.

4. The bicycle wheel according to claim 1, wherein
the spokes form a first spoke group and a second spoke group,
first spoke sections of the second spoke group extend between first base points arranged on the rim on a non-brake disc side and on a non-brake disc side of the center, and second spoke sections of the second spoke group extend between the non-brake disc side of the center and second base points arranged on the rim on the non-brake disc side, and
first spoke sections of the first spoke group extend between first base points arranged on the rim on a brake disc side and on a brake disc side of the center, and second spoke sections of the first spoke group extend between the brake disc side of the center and second base points arranged on the rim on the brake disc side.

5. The bicycle wheel according to claim 1, wherein
the spokes form a first spoke group and a second spoke group,
first spoke sections of the first spoke group extend between first base points arranged on the rim on a non-brake disc side and on a brake disc side of the center, and second spoke sections of the first spoke group extend between the brake disc side of the center and second base points arranged on the rim on the non-brake disc side, and
first spoke sections of the second spoke group extend between first base points arranged on the rim on a brake disc side and on a non-brake disc side of the center, and second spoke sections of the second spoke group extend between the non-brake disc side of the center and second base points arranged on the rim on the brake disc side.

6. The bicycle wheel according to claim 5, wherein the first and second base points of the first spoke group and/or the first and second base points of the second spoke group are arranged at a distance to an apex of the rim.

7. The bicycle wheel according to claim 1, wherein the rim is not rotationally symmetrical with respect to an axis of rotation of the bicycle wheel.

8. The bicycle wheel according to claim 7, wherein the rim has a different rim cross-section in a region of first and second base points of the spokes of a first spoke group than in a region of first and second base points of the spokes of a second spoke group.

9. The bicycle wheel according to claim 5,
wherein the spokes of the first spoke group form a spoke angle delta with a plane of symmetry of the bicycle wheel and the spokes of the second spoke group form a spoke angle epsilon with the plane of symmetry of the bicycle wheel, and
wherein the spoke angle delta and the spoke angle epsilon are substantially equal.

10. The bicycle wheel according to claim 5,
wherein the center has two opposed center discs, one center disc on the brake disc side and another center disc on the non-brake disc side, and
wherein the center discs are inclined by an angle gamma to an axis w, the angle gamma having a value between 6° and 8°.

11. The bicycle wheel according to claim 1, wherein the rim has an asymmetrical rim body, the rim body being formed as a hollow body.

12. The bicycle wheel according to claim 1, wherein the rim has a symmetrical rim body, the rim body being formed as a hollow body.

13. The bicycle wheel according to claim 5, wherein a distance from the first and second base points of the first spoke group to an apex of the rim is greater than a distance from the first and second base points of the second spoke group.

14. The bicycle wheel according to claim 5, wherein a distance from the first and second base points of the first spoke group to an apex of the rim is smaller than a distance from the first and second base points of the second spoke group.

15. The bicycle wheel according to any claim 5, wherein
the first and second spoke sections of the first spoke group in the pretensioned state enclose at the first and second base points an insertion angle beta with an outer geometry of the rim measured at a tangent applied to the outer geometry of the rim at the first and second base points,
the first and second spoke sections of the second spoke group in the pretensioned state enclose at the first and second base points an insertion angle alpha measured at a tangent line applied to the outer geometry of the rim at the first and second base points, and
wherein the insertion angle alpha is greater than 90° and the insertion angle beta is greater than the insertion angle alpha, the insertion angle beta having a value between 120° and 180°.

16. The bicycle wheel according to claim 9, wherein an angle alpha-prime is measured between a parallel plane to the plane of symmetry of the rim, which extends through the second base points, and the first spoke section, in the pretensioned state on the non-brake disc side and by an angle beta-prime measured between a parallel plane to the plane of symmetry of the rim, which extends through the first base points, and the first spoke section, in the pretensioned state on the brake disc side, wherein the angle alpha-prime and the angle beta-prime differ by a value less than or equal to 2°, and the angle alpha-prime is larger than the angle beta-prime.

* * * * *